Figure 1:
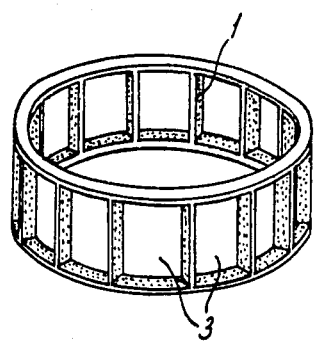

United States Patent [19]

Verburg et al.

[11] Patent Number: 4,744,679

[45] Date of Patent: May 17, 1988

[54] PLASTIC CAGE FOR A ROLLING BEARING

[75] Inventors: Martin B. Verburg, Amersfoort; Graham E. Hollox, Voorschoten, both of Netherlands

[73] Assignee: SKF Industrial Trading and Development Co. B.V., Nieuwegein, Netherlands

[21] Appl. No.: 907,396

[22] Filed: Sep. 15, 1986

[30] Foreign Application Priority Data

Sep. 27, 1985 [NL] Netherlands .................... 8502656

[51] Int. Cl.$^4$ .................... F16C 33/38; F16C 33/44; F16C 33/46
[52] U.S. Cl. .................... 384/523; 384/527; 384/572; 384/912
[58] Field of Search .................... 384/523–534, 384/572–580, 276, 912, 913

[56] References Cited

U.S. PATENT DOCUMENTS

| | | | |
|---|---|---|---|
| 3,162,493 | 12/1964 | Hanau | 384/527 |
| 3,522,974 | 8/1970 | Polti | 384/276 X |
| 3,743,551 | 7/1973 | Sanderson | 148/16.6 X |
| 4,043,623 | 8/1977 | Rausch et al. | 384/276 |
| 4,140,592 | 2/1979 | Orlando | 384/912 X |
| 4,335,924 | 6/1982 | McCloskey | 384/912 X |

FOREIGN PATENT DOCUMENTS

| | | | |
|---|---|---|---|
| 10818 | 2/1981 | Japan | 384/576 |
| 1311854 | 3/1973 | United Kingdom | 384/913 |

Primary Examiner—Stuart S. Levy
Assistant Examiner—Thomas R. Hannon
Attorney, Agent, or Firm—Rosen, Dainow & Jacobs

[57] ABSTRACT

A cage for retaining rolling elements within a bearing assembly, the cage comprising an annular member of plastic having openings spaced around the member for receiving and holding the rolling elements, the surfaces of the openings contacting the rolling elements having thereon a deposited layer of a non-plastic material which is much harder than the soft plastic and is capable of resisting the embedment of loose particles therein. The layer hard material is formed by ionic spray discharge or ion implanation and consists of chromium nitride.

4 Claims, 1 Drawing Sheet

PLASTIC CAGE FOR A ROLLING BEARING

The invention relates to a plastic cage for a rolling bearing.

In many rolling bearings, a cage is an essential part, to hold the rolling elements separate in the bearing. In general, a bearing cage consists of an annular body in which, by one method or another, openings are formed, wholly enclosed or otherwise, at equal intervals from each other on the peripheral surface, which openings each embrace a rolling element in assembled condition. The peripheral surface of the annular body need not necessarily be cylindrical, but may alternatively be conical in axial direction.

Figure 2:
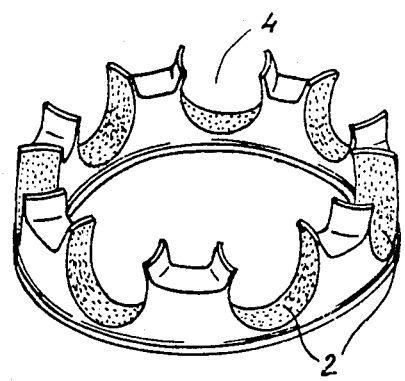

In the drawing,

FIGS. 1 and 2 represent cages for given rolling bearings by way of example.

Most cages may advantageously be made of a plastic, such material being highly suitable for the purpose by reason of its physical properties and because of considerations of manufacture.

It has been found that rolling bearings equipped with one or more cages end to exhibit defects after only a comparatively short time in service, despite all precautions observed in manufacture and in operation.

According to the invention, it has now been recognized that the cause of these defects lies in the embedding of comparatively hard foreign particles in the comparatively soft material of the cage, which particles may penetrate into the bearing, particularly by way of the lubricant, these particles exerting a cutting or chipping action on the rolling elements of the bearing, damaging these to such an extent that the bearing becomes prematurely unserviceable.

According to the invention, a solution has been provided to this problem, in that at least a portion of the cage is provided with a surface layer of a comparatively hard material, which layer is formed on a surface of the cage preferably by means of ionic discharge or ion implantation.

Preferably the layer consists of chromium nitride, since then only comparatively low temperatures need be employed during the spray discharge, which temperatures can be readily withstood by cages of a plastic material.

It is noted that, for example from the University of Illinois publication entitled "Deposition Technologies for Films and Coatings," by J. Thornton, it is known that plastic automobile parts may be provided with a decorative chromium layer by spray technology, as it is called.

In the drawing, FIGS. 1 and 2 show two embodiments of rolling bearing cages according to the invention by way of example, which cages are provided at least on the insides 1 and 2 of the openings 3 and 4 respectively with a surface layer of chromium nitride produced by spray discharge. The openings 3 and 4 embrace the rolling elements of the bearing to keep the elements separate from each other.

We claim:

1. In a lubricated rolling bearing assembly comprising rolling elements and a cage for retaining the rolling elements within the assembly, said cage comprising an annular member of relatively soft plastic having openings spaced around the member for receiving and holding the rolling elements, the surfaces of said openings contacting the rolling elements having thereon a deposited layer of a non-plastic material which is much harder than the soft plastic and is capable of resisting the embedment therein of loose particles which may cause damage to the rolling elements during use.

2. The assembly according to claim 1, characterized in that a layer of a hard material is formed on the surface of the cage by means of ionic spray discharge or ion implantation.

3. The assembly according to claim 2, characterized in that the layer consists of chromium nitride.

4. The assembly of claim 1 wherein only the contacting surfaces of the cage are provided with the said harder layer.

* * * * *

UNITED STATES PATENT AND TRADEMARK OFFICE
CERTIFICATE OF CORRECTION

PATENT NO. : 4,744,679
DATED : May 17, 1988
INVENTOR(S) : MARTIN B. VERBURG, ET AL.

It is certified that error appears in the above-identified patent and that said Letters Patent is hereby corrected as shown below: Title page:

In the abstract, line 10, change "implanation" to --implantation--.

Signed and Sealed this

Twenty-fourth Day of January, 1989

*Attest:*

DONALD J. QUIGG

*Attesting Officer*   *Commissioner of Patents and Trademarks*